United States Patent [19]
Dolence

[11] Patent Number: 4,837,956
[45] Date of Patent: Jun. 13, 1989

[54] PLASTIC ADVERTISING INSERT FOR FOOD PACKAGES

[75] Inventor: Dale E. Dolence, Carbondale, Ill.

[73] Assignee: Lustour Corporation, Murphysboro, Ill.

[21] Appl. No.: 36,388

[22] Filed: Apr. 9, 1987

[51] Int. Cl.⁴ .......................... G09F 3/100; B32B 3/00
[52] U.S. Cl. ........................................ 40/299; 428/200;
    428/201; 428/203; 428/204; 428/517; 428/521;
    428/523; 428/914; 428/910; 428/424.8
[58] Field of Search ............... 428/200, 201, 203, 204,
    428/517, 521, 523, 914, 910, 424.8; 40/299

[56] References Cited

U.S. PATENT DOCUMENTS

| | | | |
|---|---|---|---|
| 3,249,286 | 5/1966 | Palmer | 229/55 |
| 3,494,056 | 2/1970 | Elzer | 428/913.3 X |
| 4,048,736 | 9/1977 | Castleman | 428/500 |
| 4,440,824 | 4/1984 | Boni | 428/517 |
| 4,657,803 | 4/1987 | Pernicano | 428/200 |

Primary Examiner—P. C. Ives
Attorney, Agent, or Firm—Mann, McWilliams, Zummer & Sweeney

[57] ABSTRACT

A printed insert for food packages consisting of a film laminate including a central core layer of biaxially oriented polymeric film printed on one or both sides, then coated on both sides with a layer of adhesive over which is laminated an outer layer of transparent, grease-resistant, biaxially oriented polymeric film, the resultant laminate sealing the printing ink.

4 Claims, 1 Drawing Sheet

PLASTIC ADVERTISING INSERT FOR FOOD PACKAGES

BACKGROUND OF THE INVENTION

The present invention relates to printed inserts which are placed in packages containing food products. In the packaging and marketing of a variety of food products, such as bakery goods, cheeses, meats, and cereals, difficulty has been experienced in the insertion of coupons, recipes, collection cards, or other types of printed promotions. Numerous problems are presented when food oils contact the printing ink. The Food & Drug Administration allows only a small number of vegetable-based inks to be used in materials that are in direct contact with food. This limits the amount of applications for promotional programs. The food product must be protected from ink or odor contamination coming from the promotional coupon or card. The promotional piece must be protected from absorbing moisture or grease from the product. An in-pack premium that is soiled has the potential of imparting contamination to the product. Also, an in-pack premium that is stained, particularly a collection card, is counterproductive to the original purpose of the promotion.

At the present time, most in-pack premium promotions are printed on paper or paperboard. Up until now the only way to overcome the ink contamination problem was to over-wrap. This entails placing the insert in a cellophane bag and sealing it. Unfortunately over-wrapping has some major inherent problems that are quite disconcerting:

1. Over-wrapping is costly, in many cases doubling the cost of the promotion.
2. The contract packaging company who does the over-wrapping dictates the schedule.
3. Machines that insert the in-pack premium into the package were not made for over-wrapped pieces, and results of this mismatch are monumental including a 30 percent waste factor due to dispenser malfunction because of the over-wrap, pillowing, hang-ups on the back seal, and static build-up causing mis-feeds.

There has been an attempt at developing another type of insert which is constructed of printed paper with a polypropylene film laminated to it. This achieves the desired savings in cost by eliminating the over-wrap and protecting the food from ink contact, but this structure has very poor product resistance. In most applications, the moisture from oils and food products will seep into the paper causing stains and actually delaminating the insert. The result is a very unattractive promotion that actually exposes inks and adhesive to the food products. This problem is known as wicking and has the potential to occur in most products where in-pack premiums are used.

None of the materials produced to date have been able to solve the problems. The only method used successfully is printed paper, over-wrapped. Examples of some of the prior art arrangements discussed herein are illustrated and described in U.S. Pat. Nos. 1,849,774, 1,924,903, 2,225,694, 2,255,810, 2,578,150, 2,596,514, 2,911,305, and 3,373,045.

SUMMARY OF THE INVENTION

The present invention provides a plastic film laminate food package insert which carries a printed advertising message. The film laminate seals the printing ink against contact with grease, oil, or other moisture which might emanate from the food product. The insert consists of a central core layer of biaxially oriented polymeric film printed on one or both sides with a message to be displayed and then coated on both sides with a layer of adhesive over which is applied a top and bottom layer of transparent, grease-resistant, biaxially oriented polymeric film.

DETAILED DESCRIPTION

Figure 1:
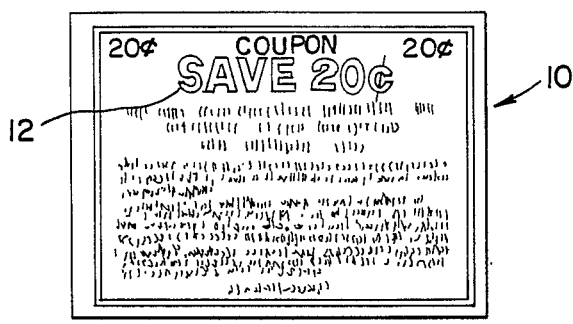
FIG. 1 is a top view of the message-carrying insert of the present invention.
Figure 2:
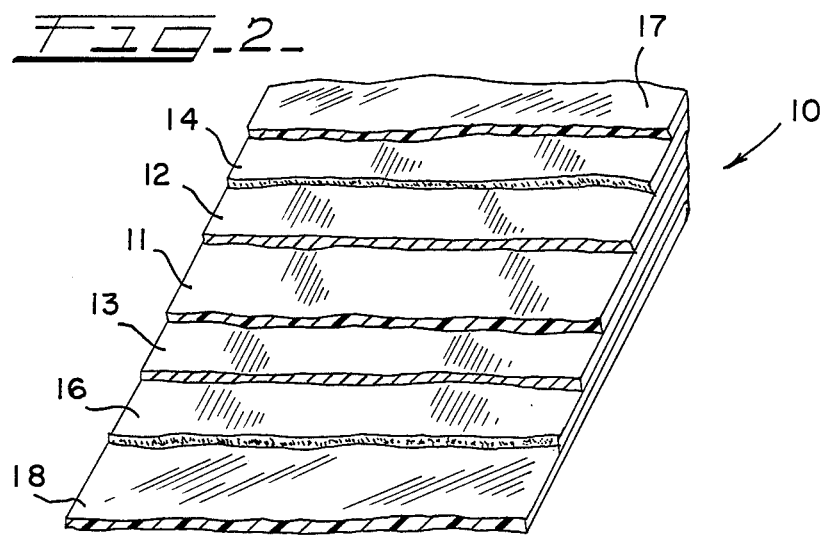
FIG. 2 is a perspective view, partially broken away, showing the various layers of the insert.
Figure 3:
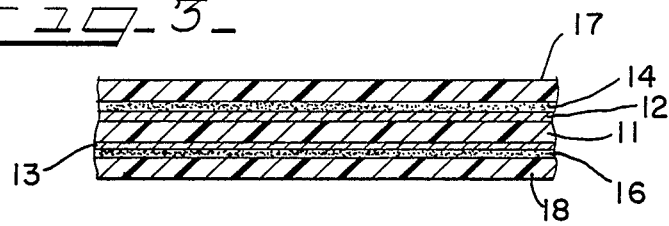
FIG. 3 is a side view, partially broken away, of the insert.
Figure 4:
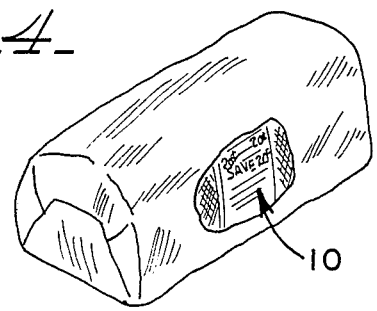
FIG. 4 is a perspective view, partially broken away, showing the insert displayed inside the outer wrapper of a loaf of bread.

FIG. 1 illustrates a message-carrying insert 10 constructed in a special way and using specific materials so as to result in a coupon which can be readily inserted in a package containing food without fear of adverse reaction between the ink forming the advertising message and the food product. As illustrated in FIGS. 2 and 3, the insert 10 consists of a plastic film laminate comprised of a plurality of layers. Although, technically, the printing ink disclosed herein is not actually a layer, it is illustrated as such in FIGS. 2 and 3 simply for purposes of explanation. This illustration approach has been used in the past and should provide no confusion to one of ordinary skill in the art.

A central core layer 11 consists of a biaxially oriented polymeric film. In the preferred embodiment, this core layer is an opaque polystyrene, but any biaxially oriented polymeric film that can receive printing inks may be used. The opacity is helpful when dual side printing is used in order to prevent being able to see the opposite printed side through the laminate. Transparent films could also be utilized, particularly if one-side printing is used. Polystyrene is preferred because of its ability to produce high quality graphics when printed, offering a variety of printing capability.

The relative thickness of the composite layers of the laminate of this invention may, of course, vary within the limits which will be recognized by those skilled in the art. In the examples discussed herein, which have been successfully made and tested, the central core layer was formed of a 3 mil, white, opaque, biaxially oriented polystyrene manufactured by Dow Chemical Company under the trademark OPTICITE 420.

In the preferred embodiment, the core layer 11 is then printed on both sides, as illustrated at 12 and 13, with an advertising message. The methods of printing which have been found suitable include rotogravure printing and flexographic process printing. Other printing techniques may also be utilized. The variety of inks which may also be used is wide in scope since the net effect of the laminate of the present invention is to seal the insert such that no contact is allowed between the ink and the food product. In the examples disclosed herein, an ink which has been found to be effective is one sold by American Inks and Coatings and designated as opticite type ink, R-22811-F1. The central core layer may be printed on either side or, most advantageously, on both sides.

The layers of printing 12 and 13 are then coated on their exterior surface by layers of adhesive, illustrated in FIGS. 2 and 3 as layers 14 and 16, respectively. This is preferably accomplished during an in-line adhesive lamination process. Adhesives which have been found to be acceptable in formulating the insert of the present invention include a two-component solvent base urethane prepolymer adhesive which is a mixture of Lamal HSA and Catalyst C in proportions as specified by the manufacturer. A two-component, water-borne acrylic adhesive system with an acid base catalyst has also been used consisting of a mixture of Morton Chemical Company Adcote 77T660 and Adcote 9T5, again in proportions as specified by the manufacturer. For hand lamination, solvent base urethane prepolymer a pressure-sensitive adhesive sold by Morton Chemical Company under the designation Adcote 333 has also been used.

Next, outer layers 17 and 18 are laminated over the layers 14 and 16, respectively. The outer layers 17 and 18 consist of any of a variety of transparent, grease-resistant, biaxially oriented polymeric films. One such film which has been utilized successfully in the practice of the present invention is a biaxially oriented polypropylene sold by Curwood, Inc. under the trademark CURPHANE 703. In the insert referred to in Example 1, a 50-gauge, biaxially oriented polypropylene is used for both layers 17 and 18. Depending on the need for stiffness and thickness, a transparent, grease-resistant, biaxially oriented polystyrene may be used for the outer layers 17 and 18. Use of polystyrene for these layers substantially stiffens the insert. One such polystyrene which has been found to be acceptable is sold by Dow Chemical Company under the designation "clear opticite" XU65021.02.

The manufacture of the insert of the present invention is preferably accomplished by an adhesive lamination of the composite sheet. The choice for the film used in the transparent, outer layer of grease-resistant, biaxially oriented polymeric film is generally dictated by the desirable characteristics of the finished product. Use of oriented polypropylene provides a clear protective covering for the inks and core layer. Use of clear, biaxially oriented polystyrene offers a stiffer finished structure. This would be advantageous to promoters who would like to duplicate the stiffness of presently used paperboard in collection cards and game pieces. The outside layers of grease-resistant film can vary in thickness depending on the use of the finished product. In general, acceptable thicknesses range between 0.5 mil and 4 mils in thickness. The core layer is preferably opaque polystyrene. The opacity is preferred because of the ability to present high quality graphics offering the end user a variety of printing capabilities.

Certain preferred embodiments of this invention and methods of making the laminate are illustrated in the following specific examples:

No. 1. A central core layer of 3 mil white opaque opticite 420, Dow Chemical Company (polystyrene), was rotogravure printed, both sides in register, with American Inks and Coatings opticite type ink, R-22811-F1. This structure was then in-line adhesive laminated on both sides to an outer layer of 50GA oriented polypropylene, Curwood, CURPHANE 703, with a layer of adhesive designated as Morton Chemical Company Adcote 77T660 & Adcote 9T5.

No. 2. A central core layer of 3 mil white opaque opticite 420, Dow Chemical Company (polystyrene), was rotogravure printed, both sides in register, with American Inks and Coatings opticite type ink, R-22811-F1. This structure was then in-line adhesive lamnated on both sides to an outer layer of 50GA oriented polypropylene, Curwood, CURPHANE 703, with a layer of adhesive designated as Morton Chemical Company Lamal HSA and Catalyst C.

No. 3. A number of samples were also hand laminated utilizing a central core layer of 3 mil white opaque opticite 420, Dow Chemical Company, printed on both sides with the same ink as set forth in Examples 1 and 2, and then laminated on both sides to a variety of gauges of clear opticite, Dow Chemical Company (polystyrene), utilizing a layer of pressure-sensitive adhesive designated as Morton Chemical Company, Adcote 333.

Rolls of each of the laminates described in Examples 1, 2, and 3 were then taken to an off-line sheeter and sheeted. During this process, a food grade, anti-static powder was applied to the web, in order to control static through the rest of the manufacturing processes as well as in the placing machine utilized by the packager. The sheeted material was then jogged and guillotine cut into the 3.5 × 2.5 inch finished in-pack inserts.

Product resistance tests were performed to compare the inserts of the present invention with a laminated tagboard stock that is presently used for advertising insert applications.

Samples of each material were placed in loaves of bread at room temperature for five days. The laminated tagboard stock was badly stained and slightly delaminated. The sealed plastic structure of the present invention was not affected at all.

Next, both structures were placed in Crisco oil for 24 hours. The tagboard stock was severely damaged and completely delaminated. The plastic insert of the present invention was wiped clean and not affected at all by the oil.

Finished coupons were then tested for insertion into food packages utilizing machines known as Thiele placers. The Thiele Horizontal Cam motion placer is used extensively in the bakery packaging industry and in most horizontal feed applications of premiums. The inserts of the present invention were placed in a magazine and run at 65 placements per minute, the maximum speed of the machine. The coupons were fed successfully, problem free, one at a time. The surprising superiority of the new plastic insert was also confirmed by an independent source using the same test method. This product can be produced in roll stock form, to be run on placers that cut the coupon off of the roll and place it in the packages. The combination of materials of the present invention exhibits substantial superiority over prior art materials.

Thus, it has been shown that the message-carrying insert of the present invention consists of a plastic film laminate which contains an advertising message printed on one or both sides that will not be adversely affected by exposure to moisture or oils in the food product with which it is intimately associated. The message-carrying insert does not need to be over-wrapped or protected in any exterior way to be successfully used. It can also be put into packages by placing machines efficiently eliminating the large waste factors which are typical of prior art embodiments. The coupons of the present invention are available in a wide range of finished thicknesses to accommodate a large variety of promotional opportunities including coupons, collection cards, games, etc. The message-carrying insert of the present invention incorporates a printing surface that allows for high quality graphics produced by rotogravure or flexographic process printing.

The method of manufacture of this insert creates a plastic film laminate in which static electricity is controlled to eliminate processing and feeding problems. The resultant insert is clean and crisp looking when removed from the food product. When used with products such as meat and cheese, it offers the ability to be rinsed and wiped clean of any grease or oil emanating from the food product. These objectives are achieved without the use of an expensive over-wrap typical in prior art constructions. Contact between the ink and moisture from the food product has been eliminated because the ink is sealed within the lamination. The plastic is a functional barrier between foods and inks allowing greater flexibility as to the inks and colors which can be used. The insert is impervious to liquid absorption and is a positive guard against odor transmission, ink rub-off, and grease absorption.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A two side printed message-carrying insert comprising a grease and oil resistant, plastic film laminate adapted for insertion into packages containing food, said laminate including a central core layer of biaxially oriented polymeric film printed on both sides in register with a message to be displayed, a first layer of adhesive disposed above and adjacent said central core layer, a second layer of adhesive disposed below and adjacent said central core layer, a first layer of transparent, grease-resistant, biaxially oriented polymeric film disposed above and adjacent said first layer of adhesive, a second layer of transparent, grease-resistant, biaxially oriented polymeric film disposed below and adjacent said second layer of adhesive, whereby said adhesive and film layers seal the printed message on both sides of said core layer and prevents contact between moisture from the food product and the printing ink disposed on both sides of said central core, resulting in a plastic insert of high clarity which is substantially unaffected by contact with food.

2. A plastic film laminate as in claim 1 in which said central core layer of polymeric film is opaque.

3. A plastic film laminate as in claim 1 in which said central core layer is polystyrene.

4. A plastic film laminate as in claim 1 in which said central core layer is opaque polystyrene.